Oct. 22, 1935. R. E. ASBURY 2,017,933
APPARATUS FOR WELDING SILICON STEEL SHEETS FOR MAGNETIC USES
Filed May 9, 1932 8 Sheets—Sheet 1

INVENTOR.
Ralph E. Asbury
BY Allen & Allen
ATTORNEYS.

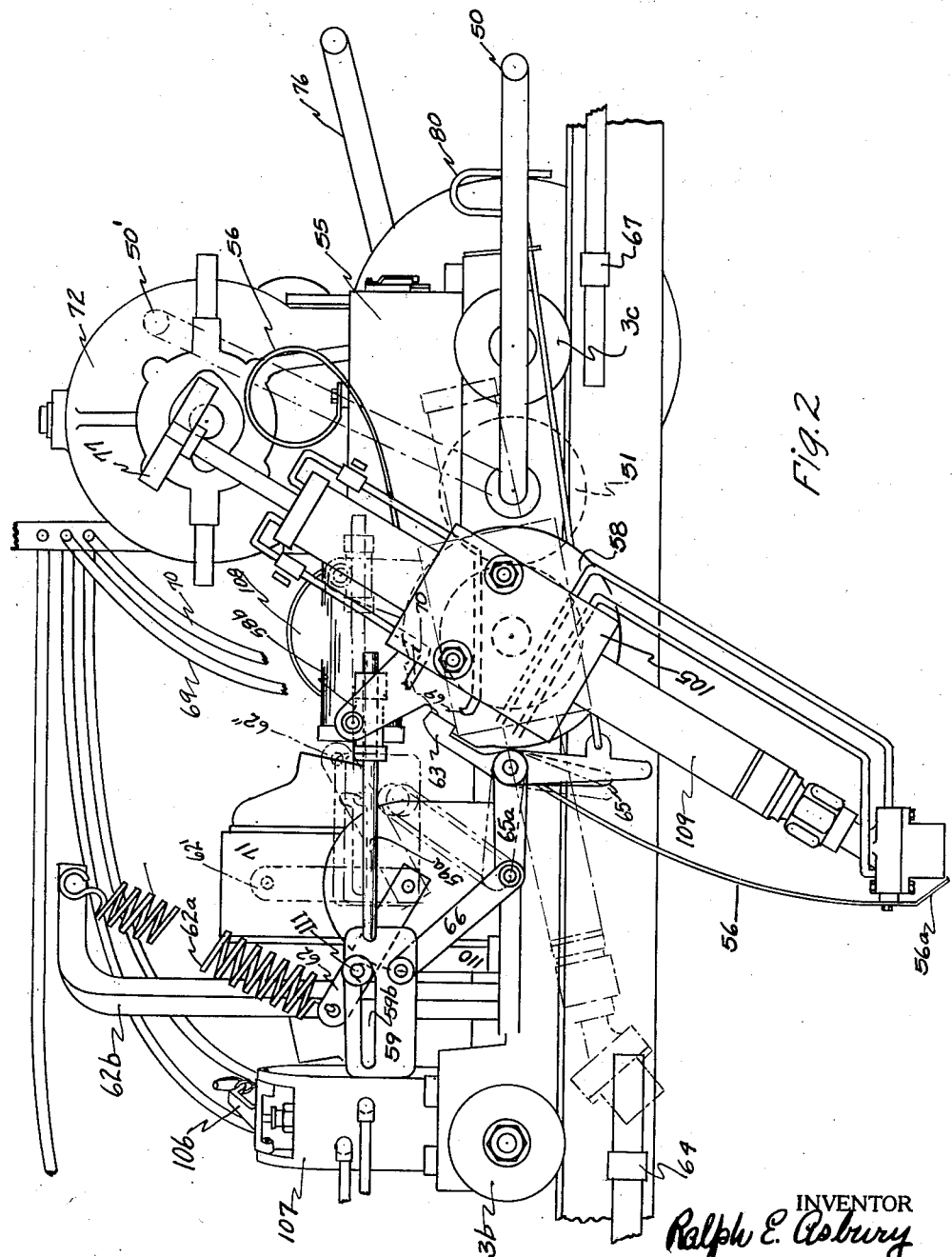

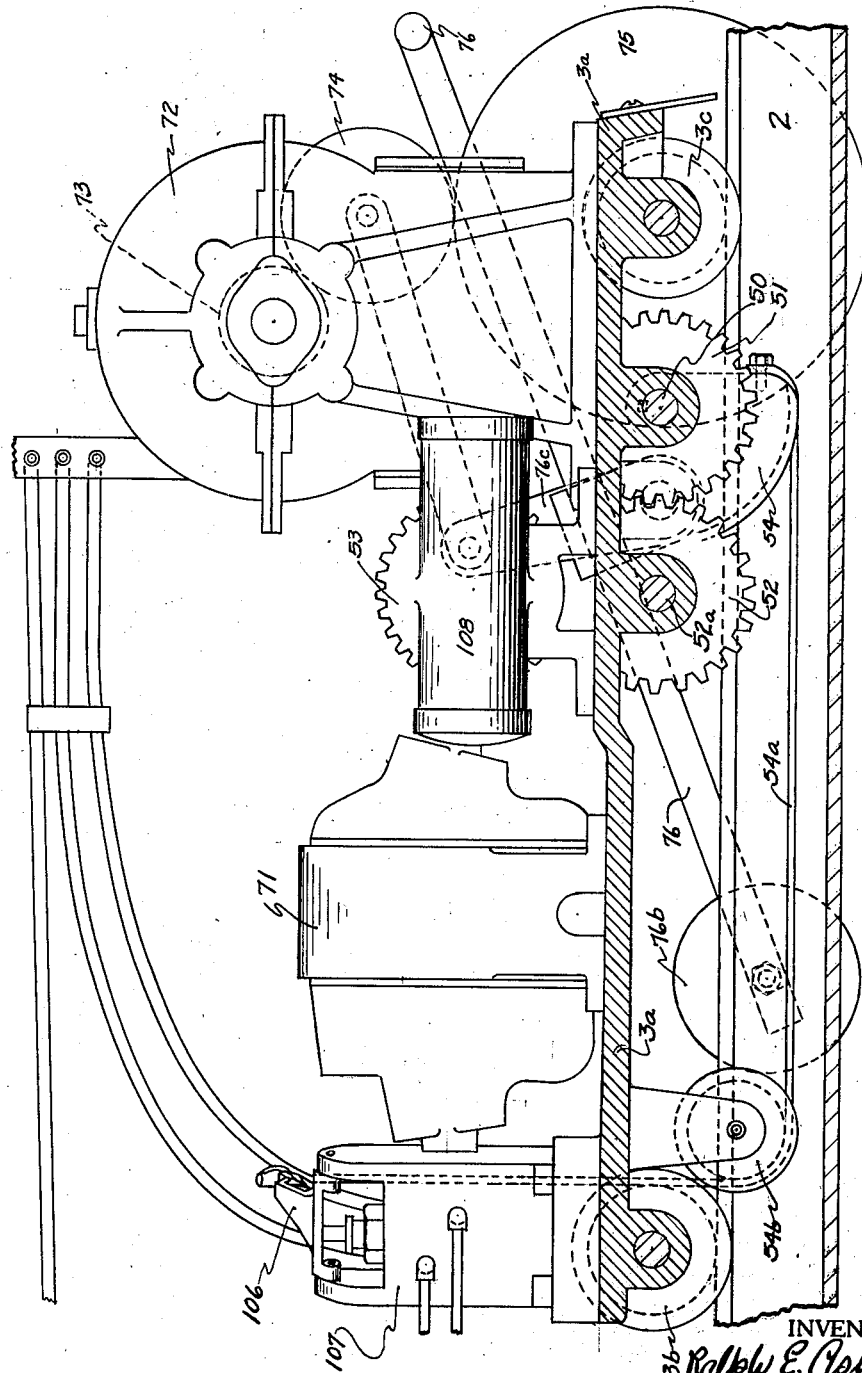

Oct. 22, 1935. R. E. ASBURY 2,017,933
APPARATUS FOR WELDING SILICON STEEL SHEETS FOR MAGNETIC USES
Filed May 9, 1932 8 Sheets-Sheet 5

INVENTOR.
Ralph E. Asbury
by Allen & Allen
ATTORNEYS.

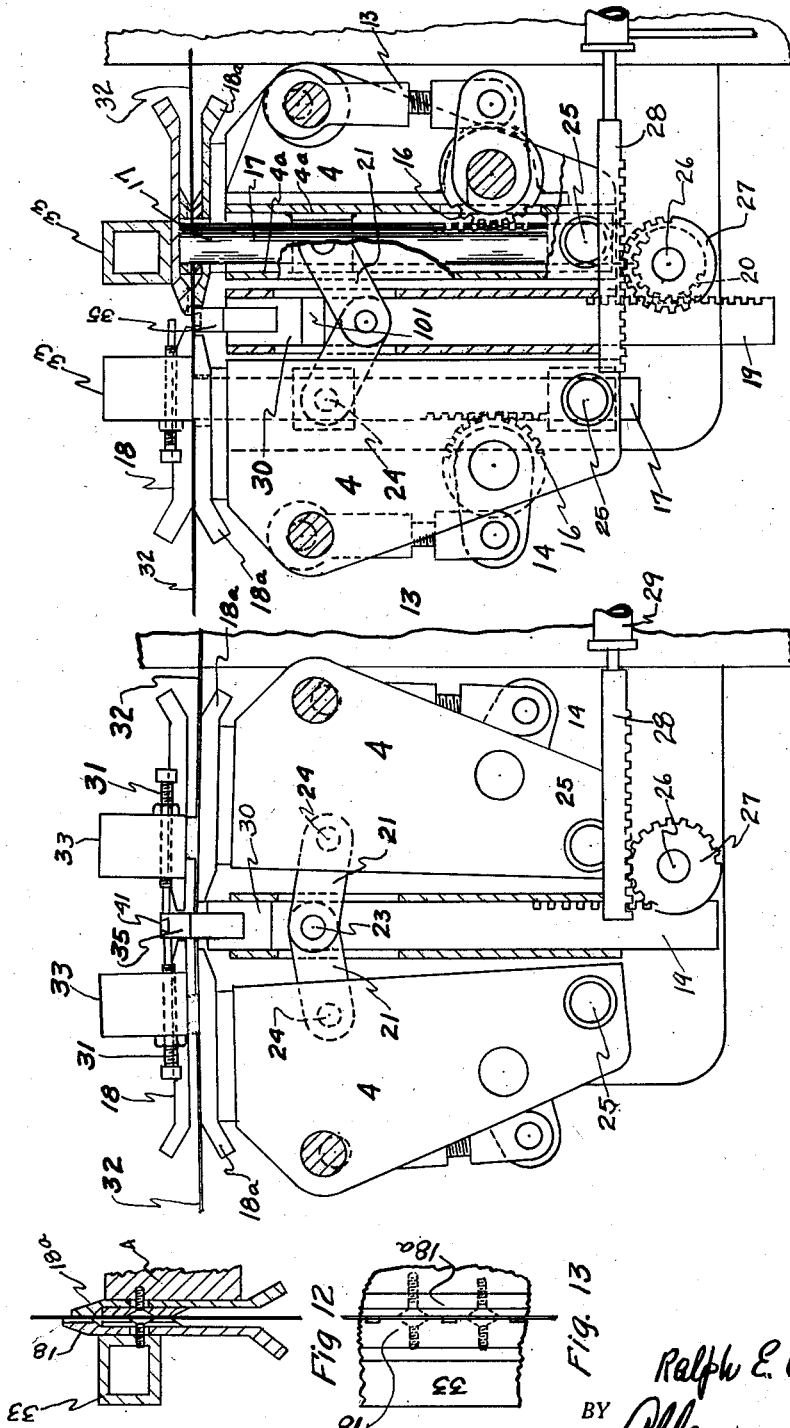

Oct. 22, 1935.　　　R. E. ASBURY　　　2,017,933
APPARATUS FOR WELDING SILICON STEEL SHEETS FOR MAGNETIC USES
Filed May 9, 1932　　　8 Sheets-Sheet 7
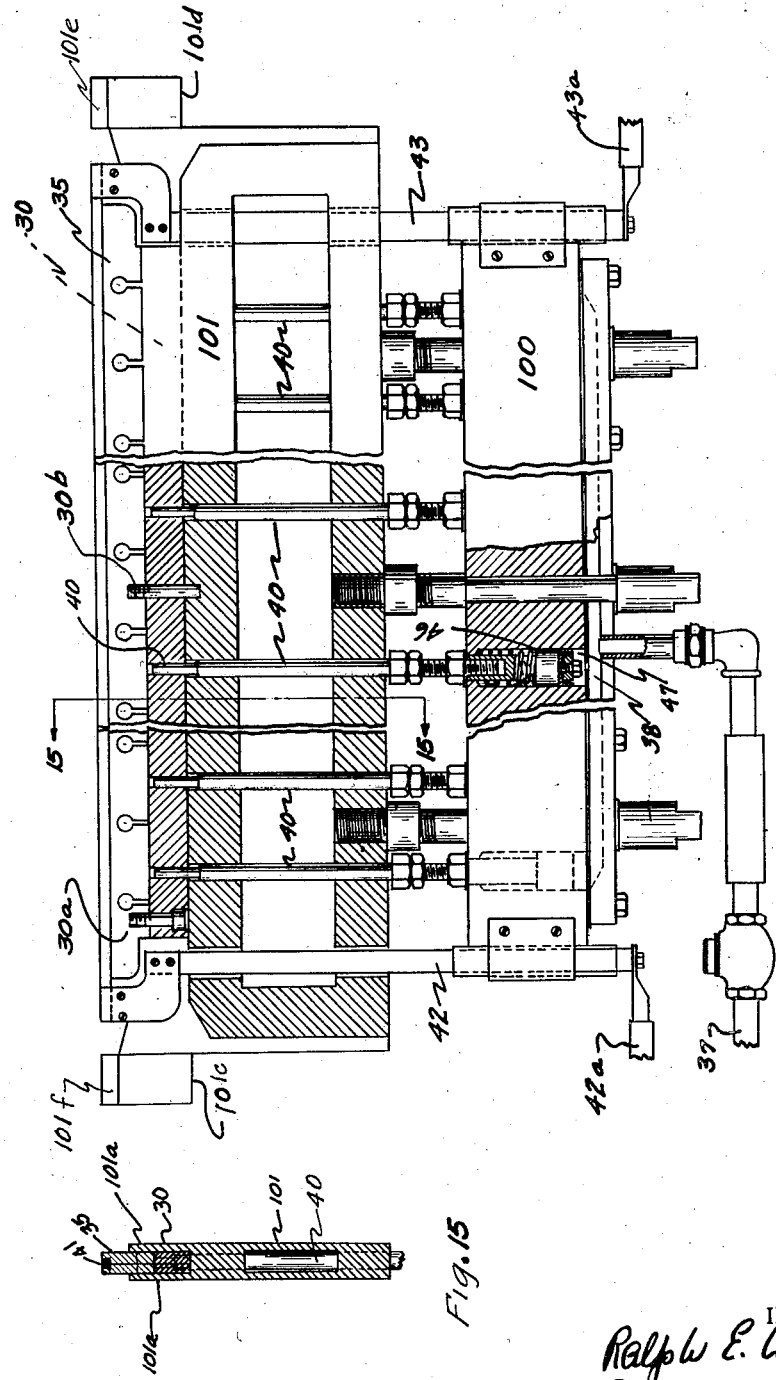

Oct. 22, 1935.   R. E. ASBURY   2,017,933
APPARATUS FOR WELDING SILICON STEEL SHEETS FOR MAGNETIC USES
Filed May 9, 1932   8 Sheets-Sheet 8

INVENTOR
Ralph E. Asbury
BY
Allen & Allen
ATTORNEYS

Patented Oct. 22, 1935

2,017,933

UNITED STATES PATENT OFFICE 2,017,933

APPARATUS FOR WELDING SILICON STEEL SHEETS FOR MAGNETIC USES

Ralph E. Asbury, Middletown, Ohio, assignor to The American Rolling Mill Company, Middletown, Ohio, a corporation of Ohio Application May 9, 1932, Serial No. 610,063

13 Claims. (Cl. 219—8)

My invention relates to methods of welding together silicon steel sheets, and is directed primarily to the provision of an adequate mechanical structure for this purpose. Large quantities of relatively thin silicon steel sheets are now being produced for uses in electrical apparatus such as transformers and the like, where good magnetic properties and low core losses are desirable. The material has hitherto always been produced in sheet form, and of ordinary sheet length. Transformer cores and the like are cut from this material usually by a stamping operation. Obviously there will be considerable waste at the ends of the individual sheets. It has been proposed to join together metallic sheets into substantially a continuous strip for the purpose of doing away with this wastage and/or permitting the continuous operation of punch presses. Until Wesley J. Beck and Alva E. Taylor developed their process of welding silicon steel sheets as set forth in their application Ser. No. 474,656, filed August 11, 1930, and copending herewith, there has never been any satisfactory way of butt welding silicon steel.

It should be remembered that for the purpose described a butt weld not appreciably thicker than the body of the sheets themselves is highly desirable because a high space factor is preferred in the finished assembly of punchings to make up the desired core. It should also be remembered that continuity in the weld is desirable both from the standpoint of strength and also to give good magnetic properties. It has been proposed to lap weld sheets of this character; but a lap weld gives a relatively low space factor and relatively poorer magnetic properties if welded punchings are to be employed in a core. Furthermore, the methods of welding employed prior to the said process, have not given sound and continuous welds. The problem of sound welds is, of course, very much intensified when butt welding is attempted.

Silicon steel is a very difficult material to handle and involves a number of peculiar problems of its own. Very high heat is necessary for the weld, because of the relatively high fusing point of the material. Atmospheric oxygen and other oxygen must be rigorously excluded from the weld. Silicon steel, so-called, is an alloy of iron materials and silicon, with or without carbon or other additional elements. At high temperatures, under the influence of heat, oxygen not only combines with the iron portions of the alloy to form oxides of iron, but also, and more immediately, combines with the silicon to form silicon dioxide, which is a substantially inert refractory material. So important is this action, that an oxidizing treatment for the sheets resulting in the formation of silica as aforesaid, has been proposed for the purpose of providing separators to prevent the sheets from sticking together in annealing treatments in which they are juxtaposed. Electrical welding, so far as my researches have extended, is impracticable for silicon steel sheets; and gas welding therefore appears to be necessary. A neutral flame must be employed, because a reducing flame does not develop sufficient heat, and an oxidizing flame will not produce a weld for reasons hereinabove stated. When the welding is done from one side, there must of necessity be, upon the other, means protecting the weld from oxidation; or the metal in certain portions will be reduced substantially to ash. Any backing means thus employed must also be capable of reaching a temperature substantially that of the weld, however this temperature may be imparted thereto. This is because a backing means which is not substantially at the temperature of the weld, and which is heat conductive, will prevent the reaching of welding temperatures during the operation.

As set forth in the copending application referred to, there is described a process, including these features, which is satisfactory for the butt welding of silicon steel sheets. My primary object in this case is to provide a mechanism suitable for the carrying on of the process as described therein. These and other objects of my invention which I will set forth hereinafter or which will be apparent upon reading these specifications, I accomplish by that certain construction and arrangement of parts of which I shall now set forth an exemplary embodiment, reference being had to the accompanying drawings, wherein:—

Figure 2 is a side elevation of the welding apparatus and carriage which is employed to move the torch automatically in the welding direction, and to return it to its proper position for the next weld.

Fig. 4 is a sectional view of the side elevation showing the gearing and other devices for automatically shutting off the supply of gas when the torch lifts.

Fig. 10 is an end elevation of the general assembly of devices for positioning and clamping the sheets.

Fig. 11 is a partial sectional view thereof.

Fig. 12 is a sectional view of a clamping arrangement for holding the sheets.

Fig. 13 is a partial front elevation of this arrangement.

Fig. 14 is a view partly in front elevation and partly in section of the general clamping arrangement and the backing bar.

Fig. 15 is a partial sectional view along the lines 15, 15 of Fig. 14.

The place of my machine in the general process of producing a wide silicon steel strip of indefinite length, will be set forth hereinafter in connection with my description of Figure 16.

My machine in itself comprises broadly a framework which supports not only the mechanism employed to hold the juxtaposed sheets in position for welding, but also means for causing a welding agency to traverse the line of weld. In its exemplary embodiment this framework may be thought of as comprising a pair of supports (1 in Fig. 1) located one on either side of the path of travel of the sheets or strip. Above this path of travel, I locate a cross member 2, forming with the framework, an inverted U. The cross member is, or supports, a trackway along which a carriage 3, bearing the torch, is moved by power means which may be automatic or semi-automatic in action.

In front of the framework, and supported by the sidewise members or legs of the U, I provide mechanism which aligns the sheet edges, clamps the sheet edges in alignment, and brings a heated backing bar up against the under side of the aligned edges, so as to heat the same and exclude oxygen therefrom.

I will describe first the clamping, supporting and aligning mechanism. In this mechanism a backing bar and supporting means, are located between sidewise moving members which bear clamping means. It will be understood that the alignment may be otherwise obtained, and that the specific alignment mechanism, except where specifically called for in the appended claims, is not a limitation upon my invention. In the embodiment herein described, the backing bar and attendant mechanism is first raised above normal position, the sheet clamp supports are spread apart, and the clamping jaws are opened. The sheets are fed through the open clamping jaws and the edges of said sheets are aligned against the side edges of the backing bar. The clamping jaws close against the sheets. Then the backing bar is lowered to below normal position, and the clamp-supporting members on either side thereof are brought together, accurately butting the edges of the sheets. Afterward the backing bar is brought up under pressure against the under side of the abutted sheet edges.

This mechanism will now be described in detail.

Figures 1, 5:
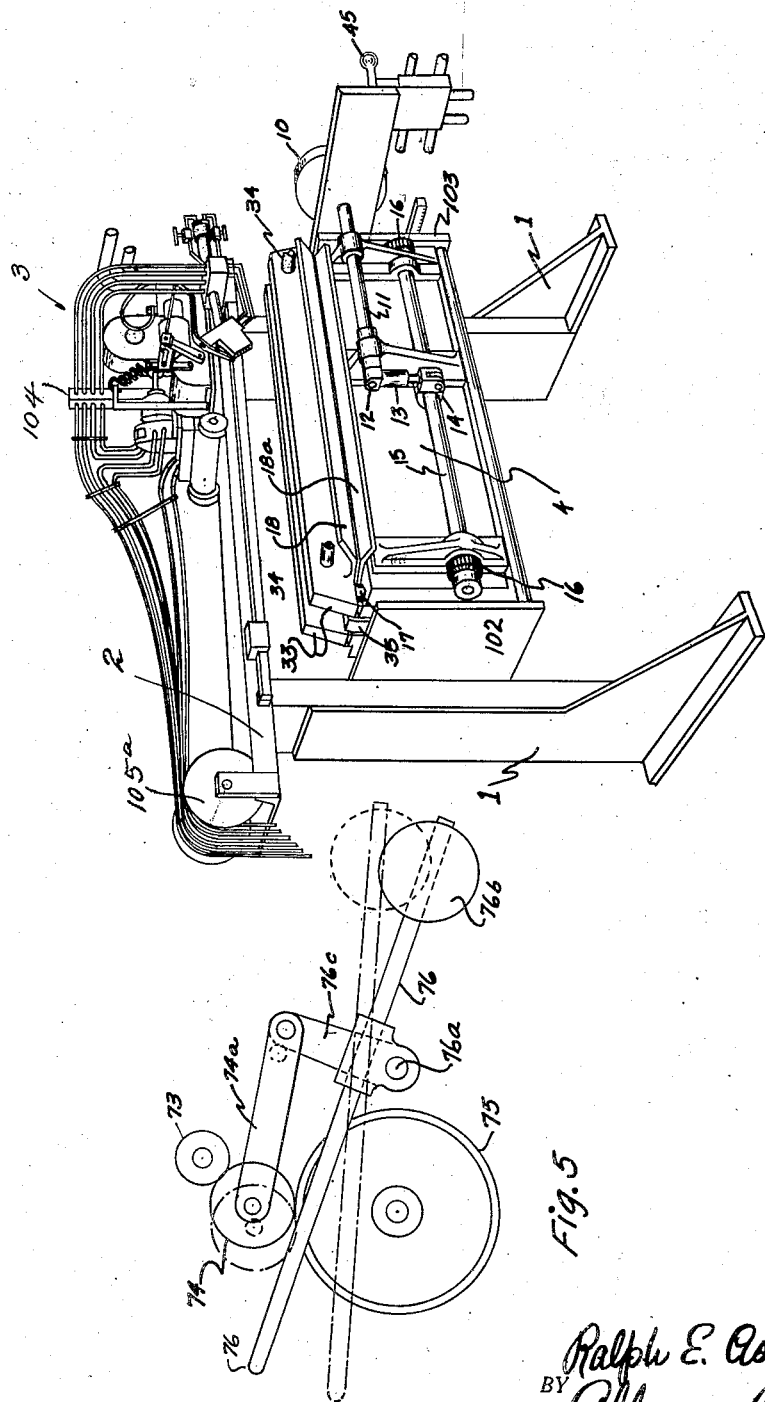
Figure 1 is a perspective view of my complete machine in its exemplary embodiment.
Fig. 5 is a side view of the carriage drive showing the driving mechanism and the lever arrangement, and which permits the moving of the carriage easily in either direction without stopping the motor.

A pair of clamp bearing members 4 are shown in Figs. 1, 10 and 11. These members are in opposed relationship, and are adapted to grip and hold the sheets in position on each side of the line of weld. To this end, they bear lower clamping members 18a, and substantially vertically reciprocating, upper clamping members 18, which are mounted upon rack members 17 extending down through the members 4.

In Fig. 1, I have shown a hand wheel 10 fastened to one end of a shaft 11. On the other end of shaft 11 is an offset pin, or eccentric coupling 12 connecting the link 13 with the crank arm 14 on the lower shaft 15, so that the rotation of hand wheel 10 will rotate shaft 15. On each end of shaft 15 are pinion gears 16, which mesh with the vertically movable rack 17. On the top of rack 17 is the upper half 18 of the clamping jaws. It can be seen that with this arrangement, the rotation of the hand wheel 10 will lift the upper half 18 of the clamp from the lower half 18a. There is another set of similar clamps and operating means upon the other of the members 4, with a separate hand wheel located adjacent the wheel 10. This can not be shown in Fig. 1, but the general organization may be seen in Figs. 10 and 11.

The two clamping assemblies 4, are pivoted as at 25, so that they may be rocked toward or away from each other. The backing bar assembly is located therebetween. This general assembly is shown in Fig. 14 where there is an upper head member 101 and a lower head member 100 rigidly connected together; but the whole assembly is free to move vertically up and down, and is guided against horizontal or endwise movement in a fixed guide which spans horizontally the end plates 102 and 103 Fig. 1 attached to the vertical legs of the U frame. This guide is rigidly attached to these end plates. Racks 19 are mounted slidably in a vertical direction only, in the fixed guide for the backing up assembly shown in Fig. 14, and are free to move upwardly or downwardly with reference to this assembly. The backing bar proper, which will hereinafter be more fully described, lies above the upper head member.

As shown in Figs. 10 and 11, the racks 19 are raised and lowered by means of gears 20 meshing with the teeth on these racks. The gears 20 may be keyed to a shaft 26, which projects out from the side of the assembly, is mounted in the plates 102 and 103, and carries a gear 27. For the raising and lowering of the racks, motive power may be applied to the gear 27 by means of a rack bar 28, having teeth which mesh with the teeth of the gear 27, and which may be connected to a piston in a pressure cylinder 29. Fastened to the racks 19 by means of pins 23, in Figs. 10 and 11, are links 21 attached at the other end to the rocking end plates 4, by means of pins 24. The pins 24 are rigidly connected to the plates 4a which are horizontal spacing plates, welded to the end plates 4 holding them in the proper relation one to the other, thereby forming with the end plates an assembly free to rock about the pivots 25. The blocks of which the pins 24 are a part, serve not only as a pivot for the links 21 through the pins 24, but also as a spacing block for the plates 4 and 4a and as a fixed guide for the racks 17 which raise and lower the upper clamping members 18. The two clamp supporting assemblies 4 are, as aforesaid, pivoted at 25, so that they may be rocked toward or away from each other. When the rack 19 is in its downward position, the point 23 on rack 19 is lower than the points 24 on the assemblies 4, and the links 21 are of such length that in this position the assemblies are rocked toward each other and are substantially vertically disposed. As rack 19 rises, the pivot point 23 rises, and the links 21 rock the assemblies 4 apart. When the rack 19 has risen to such a point that point 23 and point 24 are on a line, or in other words, when the assemblies 4 are as far apart as they will go, the rack 19 comes into contact with block 30 at points 101c and 101d on the back bar assembly shown in Fig. 14, and raises the entire assembly shown in Figure 14 up. This projects the backing bar 35 up between the noses of the two sets of clamps. As the rack 19 moves on and the point 23 goes higher than points 24, the two assemblies are rocked together again until the ends of the set screws 31 come into contact with the sides of the upper head member 101 on faces 101e. This position is shown in Fig. 10. The sheets 32 are now inserted between the clamps, one on each side of the raised backing bar 35, and are aligned against the sides of the backing bar. By adjusting the set screws 31 the distance of the noses of the clamps from the sides of the backing bar may be varied, so that the distance the sheets project from the clamp noses may be adjusted.

After the sheets are inserted in the clamps, the wheels 10 are again turned, thereby closing the clamps on the sheets. The piston arm 28 is moved in the opposite direction, thus lowering rack 19, which lowers the backing bar, and brings the apparatus back to the position shown in Fig. 11. Since the distance between the noses of the clamps, when in welding position (Fig. 11) is fixed, the adjusting of the sheets in the clamps when in position (Fig. 10) by the set screws 31, will result in bringing the edges of the sheets into exact abutting relationship in welding position when the adjustments are correct.

The heat of the torch is very great and I have found it beneficial to cool the jaws of the clamps by providing water boxes 33 upon the clamp faces 18. These water boxes have appropriate connections 34.

The clamps themselves are shown in elevation and section in Figs. 12 and 13. Between the upper half 18, to which the manifold 33 is attached, and the lower half 18a, which is fastened to the clamp bearing members 4, I may provide special gripping members.

It will be seen in Fig. 11 that the noses of the clamping members 18 approach each other closely adjacent the butted edges of the sheet. They may be made of heat resisting alloy, if desired, and preferably they are slotted transversely beneath at short intervals to provide freer egress for products of combustion from the chamber formed by the clamping jaws and the water cooling members 33.

In order successfully to weld light sheets, it is necessary that the two sheet edges be held not only in abutting relationship, but also in exact planar relationship. The projecting noses of the clamp members 18 provide abutments against which the sheet edges may be held from beneath to effect this relationship. This is accomplished by bringing the backing bar 35 under pressure against the sheet edges.

Figure 17:
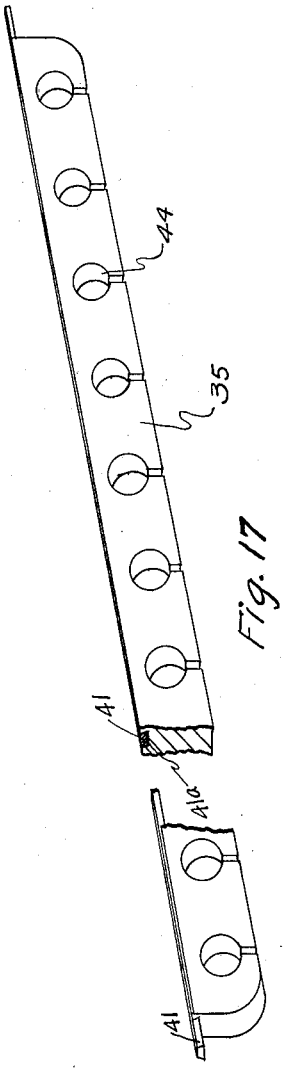
Fig. 17 is a perspective view with a part in section of the backing bar which I prefer to employ.

After the sheets have been inserted in the jaws, and the members brought to the position shown in Fig. 11, so that the sheet edges are held in abutment, the member 35, shown in Fig. 17, is pressed up against the under side of the edges of the sheet to force the edges against the lower side of the upper jaws. The backing bar 35, as shown in Figs. 14 and 17, is made of metal, with cut outs 44 spaced along its length, thus making it relatively flexible. The backing bar may be affixed to, or positioned within a slot in the member 30. A number of plungers 40 pass through the upper head member 101, and are connected with pistons 46 in cylinders 47 formed in the lower head member 100. A number of these plungers are provided, contacting the backing bar from underneath along the length thereof. A manifold 38 may be provided beneath the lower head 100 to conduct air, oil or other fluid to the several cylinders 47, and fluid inlet means 37 may be connected to the manifold. It will be clear that the admission of fluid under pressure to the cylinders 47 will cause the plungers 40 to be driven upwardly, warping the backing bar into absolute contact with the sheet edges, and pushing the sheet edges up against the noses of the clamping members 18. A valve 45 (Fig. 1) may be located in a position of convenient access to the operator, for controlling the admission of fluid to the cylinders.

While it would be possible to employ a relatively non-heat-conducting backing bar and heat it up to a temperature approaching the temperature of the weld by any suitable means, yet I prefer to provide electrical heating means in the backing bar itself. I therefore form a dovetail groove in the top of the backing bar 35, and place therein a resistance heating bar of heat-resisting alloy, 41, the said bar being embedded in mica 41a, or the like, by means of which it is insulated from the backing bar proper. The upper surface of the resistance heating bar 41 is flush with the upper surface of the backing bar. A low voltage current is applied to the projecting ends of the heating bar 41 by means of bus bars 42 and 43. These conductors may be slidably mounted with reference to the lower head 100 because the backing up bar and the balance of the assembly are relatively movable; cables 42a and 43a are fastened to the bus bars. A low voltage current is sufficient to drive a high amperage through the heater bar 41, and for this reason it will usually be necessary to provide a transformer, not shown, or other special source of low voltage, high amperage power supply.

In Figs. 14 and 15, I have shown a construction in which the member 30 and the lower part of the backing bar 35 are fastened together as by means of bolts 30a, at the ends thereof, and a central slidable pin 30b, and are held between sidewise flanges 01a of the upper head.

When welding material which is free from scale, so that there would be a tendency for the current to pass from the heating bar 41 to the sheets themselves and back again, thus short circuiting the heating bar, I may provide a resistance element which is broken in several places, and supply the current to each small section thereof, rather than at the ends as shown in Fig. 14. Such difficulty is rarely encountered, however, with silicon steel.

I next describe the movable carriage which causes a welding device to traverse the welding line, where the sheet edges are held in abutting relationship by the mechanism aforesaid.

Two rails or tracks are provided for the welding mechanism to move upon, and are so placed that the movable carriage will always be in the correct location for proper welding of the sheets. I prefer to utilize for this trackway, the cross member 2 of the main framework. If this member is made, as shown, of a piece of channel iron, the legs thereof will form the rails after being machined true. The carriage which supports the torch moves along these rails and is provided with automatic means to terminate such movement at either end. I have found it advisable and expeditious to provide means for returning the carriage to the starting position automatically, when the actual welding is completed.

The carriage indicated generally in Fig. 1 at 3 is shown most clearly in Fig. 4 as comprising a base or body 3a, which is slidably mounted upon the rails of member 2 by means of wheels 3b and 3c. The carriage rides upon these wheels transversely to the direction in which the sheets to be welded extend, and therefore follows the line of weld to be formed therein. For convenience, I mount upon this carriage a number of controlling and operating instrumentalities. There is, of course, the welding torch hereinabove mentioned, which is pivoted upon the carriage and is arranged to be swung down into welding position during the forward travel of the carriage, and up out of the way during the reverse travel of the carriage so as not to interfere with the positioning of additional sheets to be welded. There are, as adjuncts to the welding torch, devices to control its movements, devices to effect the ignition of the torch when desired, and devices to control the admission of fuel and oxygen thereto. Secondly, I mount upon my carriage driving means so as to move the carriage in the forward and reverse directions along the rails, and in connection with this driving means there are various controllers. Thirdly, the carriage bears, in part, those connections for power, and the fluid and gas connections necessary to the operation of the instrumentalities aforesaid. These I shall not particularly describe since they comprise either cables for electrical connection or appropriate flexible tubes for the fluid connections. Their functions and the way in which they are connected for proper operation will be clear to one skilled in the art, and while I have illustrated some of them in certain of the figures, not all of them are so illustrated since this would unduly complicate the figures. As indicated in Fig. 1, some of these connections at least are carried by a post or bracket 104 on the carriage; the tubes or cables are tied together where necessary; and to allow for the transverse movement of the carriage I have found it convenient to pass the tubes and cables over a rotating reel 105a at the end of the transverse member 2.

I will describe first the mounting and controlling devices for the torch. A handle 50 is provided, which may be a bent shaft as shown in Figs. 2 and 4. A portion of this shaft is journaled on the carriage, and a gear 51 is affixed thereto. This gear meshes with another gear 52, mounted on a shaft 52a, journaled on the carriage. To this shaft I attach the torch, or a holding device therefor indicated generally at 105. It will be clear that through the action of the mechanism aforesaid, when the handle 50 (Fig. 2) is brought down from the position shown at 50' in dotted lines, to the position shown in full lines, the torch will be rocked downwardly from the position shown in dotted lines to the position shown in full lines.

I attach a segment member 54 non-rotatably to the gear 51, or shaft 50, and connect it by means of a cable 54a, which may pass over a sheave 54b, to the operating handle 106 of a commercial type gas saver indicated generally at 107. Gas connections are made through the gas saver to the torch, and the operation of the mechanism aforesaid will be to permit the handle 106 to rise and therefore admit gas to the torch when the handle 50 is depressed, bringing the torch down into welding position.

In order to provide for the automatic ignition of the welding torch as the gases are admitted thereto, I have mounted a spark coil 55 upon the carriage. This spark coil will be understood as having appropriate current connections, and as having one terminal of its secondary grounded to the carriage body. The other terminal is connected by a flexible cable 56 to an electrode 56a, attached to the torch tip and so positioned that an igniting spark will jump from the electrode to the torch tip when the spark coil is actuated. It will be understood that the coil may be continuously in operation, or may be controlled by an appropriate switch operatively connected to be actuated upon movement of the torch or of the handle 50. Preferably the coil will be in continuous operation, at least during the entire traverse of the line of weld, so as to re-ignite the torch immediately, should it become accidentally extinguished.

Gas is supplied to the torch through hoses 69 and 70. It is necessary to have a flexible gas carrying means on account of the movement of the carriage and the rotation of the torch shaft.

So that no time may be lost in returning the torch to the non-welding position, I provide a spring return suitably controlled to prevent jarring. For this purpose any suitable means may be provided, but I have successfully employed an ordinary door check indicated at 108, which combines a spring and a dash pot. A gear 53 is mounted upon the shaft of this door check and meshes with gear 52 on the shaft which controls the torch.

Figure 7:
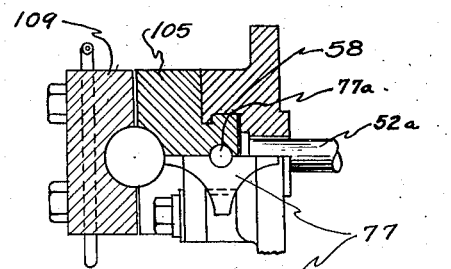
Fig. 7 is another sectional view of the adjustment shown in Fig. 6.
Figure 6:
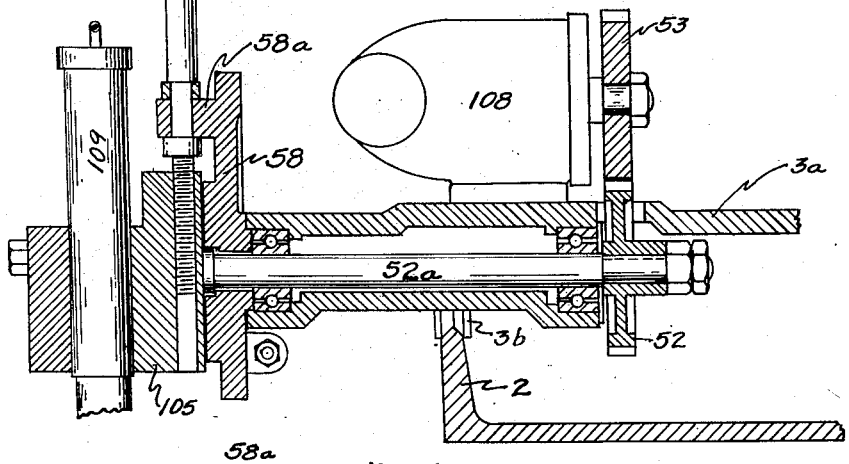
Fig. 6 is a partial sectional view of the carriage showing the adjustment for controlling the height of the torch tip with relation to the sheets which are to be welded.

The torch mounting is shown in detail in Figs. 6 and 7. The shaft 52a, bearing the gear wheel 52, is shown as mounted in ball bearings in the carriage body or base 3a. At its end the shaft bears a substantially circular element 58. Since a fine adjustment is required of the distance of the torch tip from the material being welded, I prefer to mount the torch holding element 105, itself, slidably upon the element 58. This is accomplished as shown in Fig. 7 by a tongue and groove engagement. An arm 58a upon the element 58 is drilled for the passage of a shaft 77a which may be held non-slidably but rotatably with relation thereto by appropriate nuts or collars. The shaft is threaded into a tapped hole in the member 105, so that rotation thereof will cause the member 105 to slide with reference to the element 58; and a hand wheel 77 is provided to operate the shaft. The distance of the torch tip from the work when the torch is in welding position may thus be accurately adjusted. The holding member 105 is shown as comprising two parts held together in clamping relation about the torch barrel 109 by bolts.

It is likewise desirable to control the angular position of the torch particularly when in welding position; and to this end I provide a suitable stop mechanism. An exemplary mechanism comprises an adjustable stop 81 (Fig. 3) upon the back of the member 58, arranged to contact a fixed abutment 82 on the carriage body 3a. Another adjustable stop 81a may be provided on the member 58 to control the angle of the torch in neutral or non-welding position.

The construction of a torch tip to weld light grade silicon steel sheets at high speeds, is a difficult matter. Fine holes are required for the egress of the gases, and due to the close proximity of the torch to the material being welded, these holes stop up occasionally. Hence I make my torch in two parts, as shown in Fig. 8 in order that it can be readily disassembled for cleaning purposes.

Figure 8:
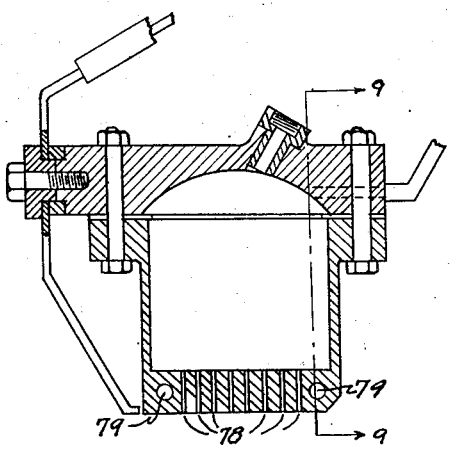
Fig. 8 is a longitudinal section of the torch tip which I prefer to use.
Figure 9:
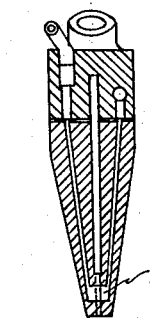
Fig. 9 is a transverse sectional view thereof taken along the lines 9, 9 of Fig. 8.

The mixed gases are brought into the chamber, shown in Fig. 8 and delivered under pressure through the small holes 78. On account of the terrific heat generated at the tip I have found it necessary to water cool this element, and sometimes the torch body itself: I accomplish this by having the tip built with three chambers, two of which are communicating through the holes 79 in Figs. 8 and 9. Water is admitted to one chamber which lies beside and is the size of the gas chamber shown in Fig. 8, through the communicating holes 79, and through another chamber on the opposite side of the gas chamber as shown in Fig. 9. The water flows into one chamber through the holes 79 and out through a pipe communicating to a hose through suitable connections. I have not more specifically described the welding torch since it is not a limitation upon my invention.

When welding, no provision is made for automatically stopping the flow of water, as is done with the gas; but this could be done if desired.

I will next described the driving means for my carriage. This comprises a motor 71 mounted upon the carriage base 3a. This motor is coupled to a standard speed-reducing gear box 72. The driven shaft 72a of the gear box bears a friction wheel 73, while another friction wheel 75 is connected to one, at least, of the wheels 3c, etc. which support the carriage upon the rails. Since it may be necessary at times to disconnect the motor from the wheels instantly, I provide an intermediate friction drive wheel 74 for transmitting power between the friction wheels 73 and 75.

A handle 76 is pivoted on the carriage body as at 76a, and counterweighted at 76b. The handle member carries an arm 76c, to which the friction wheel 74 is attached by links 74a. A clearer showing of this organization is had in Fig. 5. The action of the counterweight is to cause the arm and links to pull the friction wheel 74 against the wheels 73 and 75, operatively connecting the motor with the carriage supporting wheels or rollers. However, by pulling down on the handle 76, the wheel 74 will no longer act to transmit power from 73 to 75. Thus, without stopping the motor, I can disconnect it from the carriage drive, and move the carriage manually in either direction at will. This may, if desired, all be done by means of the handle 76. Thus I may stop the carriage and cause the torch to traverse again an imperfectly welded portion. Since the motor may still be running, the travel of the carriage will be resumed when the handle 76 is released.

I also provide means for correlating the operations of the torch and the motor, so that the motor will drive the carriage forwardly along the rails when the torch is in welding position so as to cause the torch to follow the line of the weld, and so that it will drive the carriage in the reverse direction when the torch is in neutral position, and will stop entirely when the carriage has reached the starting point. In order to provide for the forward and reverse travel of the carriage, the motor 71 is a reversible motor. It is provided with a reversing switch 110 mounted upon the carriage body. This switch has an operating arm 62 (Fig. 2) which, when it is in the vertical position 62', supplies no current to the motor. When it is rocked to the left, as shown, in full lines in Fig. 2, it supplies current for driving the motor forwardly; when it is rocked to the right as at 62'', the motor is connected for reverse movement. A spring 62a affixed to a support 62b, may be employed to urge the arm 62 toward neutral or "off" position. We provide a connection between the torch bearing mechanism and this operating arm such that when the torch is in welding position the arm will be in the "forward on" position, while when the torch is raised into the neutral position, the arm will be in the position 62''. I also provide stops adjacent the ends of the rails on member 2. The stop at the finishing end of the rails acts to trip a locking device on the torch bearing member to permit the torch to swing upwardly into neutral position, thereby changing the switch arm 62 from "forward" to "reverse" positions. The stop at the starting end of the rails acts to permit the arm 62 to change to "off" position, stopping the carriage drive at the end of the return travel of the carriage.

One form of such apparatus will now be described in detail. A hook lever 63 (Fig. 2) is pivoted upon the carriage body. The upper end of this lever bears a dog which engages in a notch in the torch mounting element 58. The lever 63 thus acts as a means for locking the torch in downward or welding position. The member 58 bears an arm 58b to which, by means of an appropriate pivoted coupling, a rod 59a is attached. A plate 59 is attached to the rod, and is slotted as at 59b, the right-hand end of the slot bending upwardly as shown. The arm 62 has a stud 111 riding in the slot. When the torch is brought down to welding position as shown in full lines in Fig. 2, and is locked by means of the dog on the lever 63, the counterclockwise rotation of arm 58b, by means of rod 59a and plate 59, pushes the switch arm 62 into "forward" position, thus starting the motor.

Adjacent an end of the rails I locate an adjustable stop 64. At the end of the forward travel of the carriage, the depending leg of lever 63 hits this stop. The dog is thereby disengaged from the notch in member 58, and the torch swings up into neutral or non-welding position under the action of the spring dash pot 108. When this happens, the clockwise rotation of arm 58b, by means of rod 59a and plate 59, pulls the switch arm over into "reverse", or position 62''. This is because the stud 111 stays in the upwardly bent portion of the slot 59b.

A bell crank lever or trigger having arms 65 and 65a is pivoted at the same point as lever 63, and is connected by a link 66 to the plate 59. At the starting end of the rails I provide an adjustable stop 67. This stop is located to strike the arm 65 when the carriage has finished its return travel. When this occurs the bell crank lever rocks in a clockwise direction, and the arm 65a, by means of the link 66, raises the plate 59, disengaging the stud 111 from the bent portion of the slot 59b. The switch arm then snaps into "off" position under the influence of the spring 62a.

Figure 3:
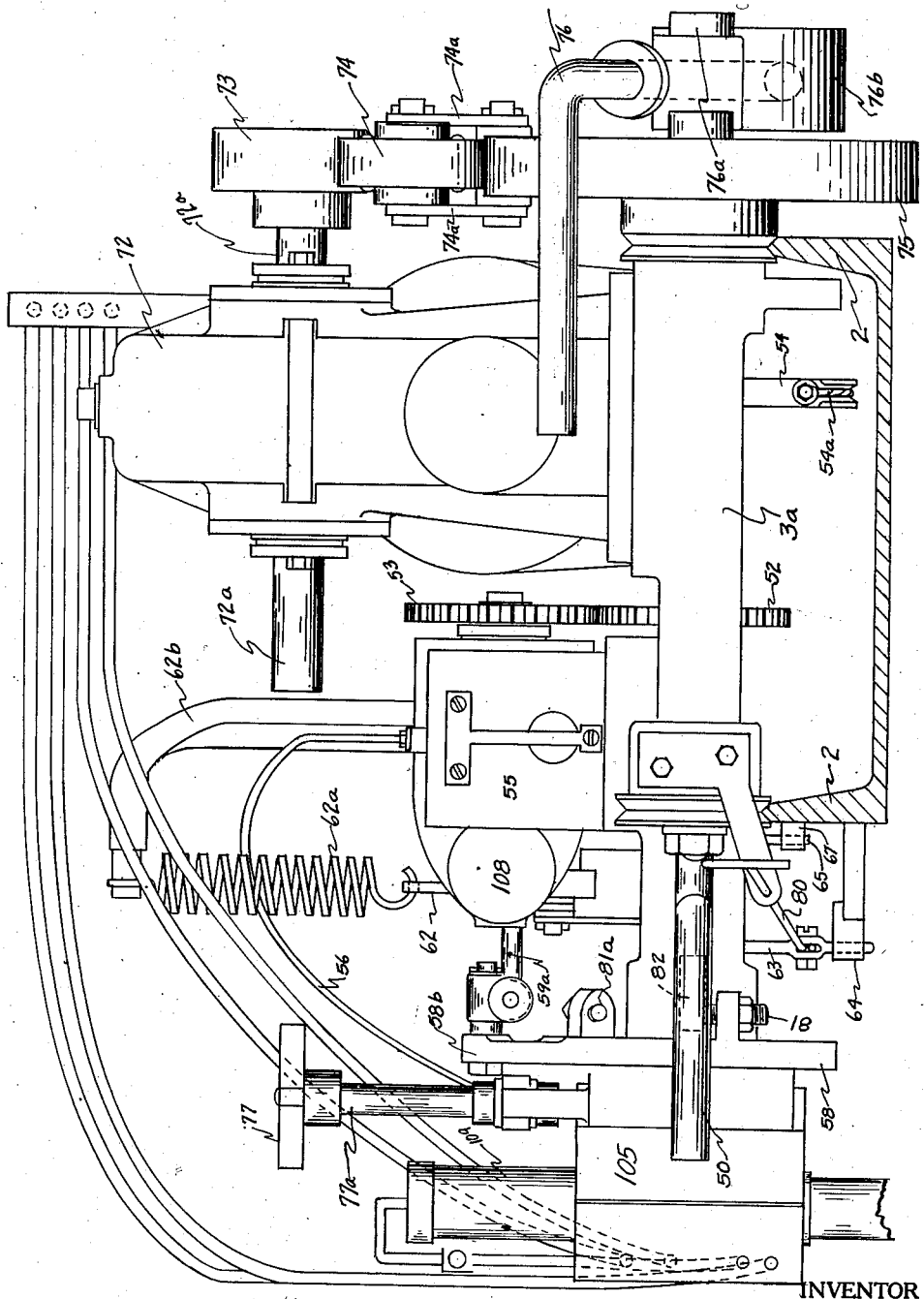
Fig. 3 is an end elevation of the carriage for the torch as shown in Fig. 2.

Thus, when the handle 50 is brought down into the position shown in solid lines in Fig. 3, an automatic cycle of operations is started. The torch is brought to welding position and locked. Gas is admitted to the torch, and the flame ignited by the spark from electrode 56a. The motor is started in the forward direction. The carriage moves along the rails causing the torch to follow the line of weld across the sheets. At the end of this travel, the torch is tripped to neutral or non-welding position, and the gas is shut off. The switch is moved to reverse position, and the carriage travels toward starting position. When this is reached the switch is tripped to off position, and the mechanism is set for the next cycle.

Since it may at times be desired to reverse the motor before the carriage has completed its travel in the forward direction, I provide a hand hook 80, arranged to trip the lever 63.

Figure 16:
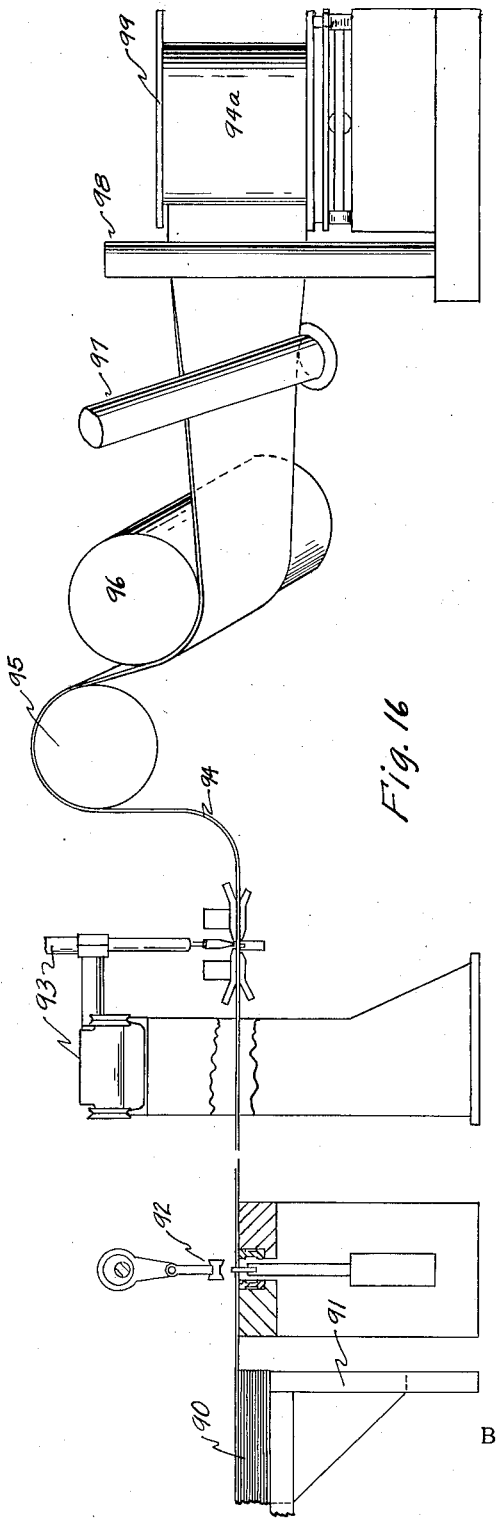
Fig. 16 is a diagrammatic view of the general arrangement of devices co-operating to produce the desired end or result, namely a coil of sheet steel in strip form and of indefinite length.

The general arrangement of practical mechanism for the formation of continuous coiled strips of silicon steel is diagrammatically illustrated in Fig. 16. Here a pile of thin silicon steel sheets 90 is shown in readiness upon a work table 91. The sheets are taken to a shear 92, and their edges trimmed so that they may be brought into exact abutment. This is preferably, though not necessarily, done by aligning the sheets, lapping the edges thereof, and severing both of the lapped edges by a single cut. The sheets next are taken to my welding device, indicated broadly at 93, where the operations hereinabove described will be carried on. With my machine, sound butt welds in thin silicon steel material may be made, not greatly thicker, if at all, than the body of the metal. If desired, the weld may be rolled to decrease its thickness, by releasing the clamps holding the sheets and passing them between a pair of rolls, not shown. Preferably such rolling, if attempted, will be done while the heat of the welding is still in the metal. Rolling has not, however, been found necessary by me in the manufacture of a commercially successful product.

In any event the result of the welding will be a band or strip of metal 94, as wide as the original sheets, and as long as may be desired. It has been found impracticable to coil thin silicon steel strip material about a horizontal axis. Consequently I have shown the strip 94 led about a plurality of reversing supports or rolls 95, 96, 97 and 98 to bring it into a vertical plane, whereupon it is wound up into the coil 94a upon a vertical coiler 99.

Modifications may be made in my apparatus without departing from the spirit thereof.

Having thus described my invention, what I claim as new and desire to secure by Letters Patent, is:—

1. In a welding device, means for holding sheets with their edges in abutting relationship, said means comprising a pair of opposed clamping devices, a backing bar, and means for forcing said backing bar up against abutted edges of sheets held by said clamping devices so as to support said sheets at the actual edges thereof, and exclude oxygen from said abutted edges, means for heating said backing bar, and mechanical means for causing a welding instrumentality to traverse the line of the abutting edges of the sheets.

2. In a welding device, the combination of gripping means for sheets to hold the edges thereof in abutting relationship, said gripping means comprising upper and lower members, said upper members having projecting lips adapted to approach each other adjacent the abutted edges, and a backing bar located upon the other side of said abutted edges and mounted to be raised against said edges so as to press said sheets against said lips.

3. In a welding device, the combination of gripping means for sheets to hold the edges thereof in abutting relationship, said gripping means comprising upper and lower members, said upper members having projecting lips adapted to approach each other adjacent the abutted edges, and a backing bar located upon the other side of said abutted edges and mounted to be raised against said edges so as to press said sheets against said lips, said backing bar being wider than the interspace between said lips and adapted to support the actual edges of said sheets so as to exclude oxygen therefrom.

4. In a welding device, the combination of gripping means for sheets to hold the edges thereof in abutting relationship, said gripping means comprising upper and lower members, said upper members having projecting lips adapted to approach each other adjacent the abutted edges, and a backing bar located upon the other side of said abutted edges and movable so as to be brought against said edges so as to press said sheets against said lips, said backing bar being wider than the interspace between said lips and adapted to support the actual edges of said sheets so as to exclude oxygen therefrom, and means for heating said backing bar to a temperature approaching that of the weld, and means for causing a welding instrumentality to traverse said line of abutting edges.

5. In a welding device, the combination of gripping means for sheets to hold the edges thereof in abutting relationship, said gripping means comprising upper and lower members, said upper members having projecting lips adapted to approach each other adjacent the abutted edges, a backing bar located upon the other side of said abutted edges and movable so as to be brought against said edges so as to press said sheets against said lips, and pressure means for raising said backing bar against said sheets.

6. In a welding device, the combination of gripping means for sheets to hold the edges thereof in abutting relationship, said gripping means comprising upper and lower members, said upper members having projecting lips adapted to approach each other adjacent the abutted edges, a backing bar located upon the other side of said abutted edges and adapted to be brought against said edges so as to press said sheets against said lips, said backing bar being wider than the interspace between said lips and adapted to support the actual edges of said sheets so as to exclude oxygen therefrom, means for heating said backing bar to a temperature approaching that of the weld, and pressure means for raising said backing bar against said sheets.

7. In a welding device, sheet gripping and positioning means comprising interspaced clamp supporting members arranged to swing apart and away from each other, said members bearing lower clamping means, upper clamping means slidably mounted with respect to said members, and a backing bar and supporting members reciprocable between said members.

8. In a welding device, sheet gripping and positioning means comprising interspaced clamp supporting members arranged to swing apart and away from each other, said members bearing lower clamping means, upper clamping means slidably mounted with respect to said members, and a backing bar and supporting members reciprocable between said members, said backing bar arranged to be raised between said clamping devices to permit the alignment of sheet edges against the sides of said backing bar when said clamp bearing members are rocked away from each other, said clamp bearing members adapted to be rocked upon the lowering of said backing bar to a position to bring said sheet edges in exact abutment, and means for raising said backing bar against the actual edges of said abutted sheets.

9. In a welding device, sheet gripping and positioning means comprising interspaced clamp supporting members arranged to swing apart and away from each other, said members bearing lower clamping means, upper clamping means slidably mounted with respect to said members, a backing bar and supporting members reciprocable between said members, said backing bar arranged to be raised between said clamping devices to permit the alignment of sheet edges against the sides of said backing bar when said clamp bearing members are rocked away from each other, said clamp bearing members adapted to be rocked upon the lowering of said backing bar to a position to bring said sheet edges in exact abutment, means for raising said backing bar against the actual edges of said abutted sheets, and power means for actuating said several devices.

10. In a welding device, sheet gripping and positioning means comprising interspaced clamp supporting members arranged to swing apart and away from each other, said members bearing lower clamping means, upper clamping means slidably mounted with respect to said members, a backing bar and supporting members reciprocable between said members, said backing bar arranged to be raised between said clamping devices to permit the alignment of sheet edges against the sides of said backing bar when said clamp bearing members are rocked away from each other, said clamp bearing members adapted to be rocked upon the lowering of said backing bar to a position to bring said sheet edges in exact abutment, means for raising said backing bar against the actual edges of said abutted sheets, said upper clamping members having projecting lips adapted to approach each other adjacent said abutted sheet edges, and means for raising said backing bar under pressure so as to force said sheets against said projecting lips.

11. In a welding device, sheet gripping and positioning means comprising interspaced clamp supporting members arranged to swing apart and away from each other, said members bearing lower clamping means, upper clamping means slidably mounted with respect to said members, a backing bar and supporting members reciprocable between said members, said backing bar arranged to be raised between said clamping devices to permit the alignment of sheet edges against the sides of said backing bar when said clamp bearing members are rocked away from each other, said clamping bearing members adapted to be rocked upon the lowering of said backing bar to a position to bring said sheet edges in exact abutment, means for raising said backing bar against the actual edges of said abutted sheets, said upper clamping members having projecting lips adapted to approach each other adjacent said abutted sheet edges, and means for raising said backing bar under pressure so as to force said sheets against said projecting lips, said backing bar made of relatively flexible construction, and said pressure means adapted to flex said bar so as to bring said bar into accurate supporting contact with said abutted sheet edges.

12. In a welding device, a sheet gripping and positioning means comprising interspaced clamp supporting members arranged to swing apart and away from each other, said members bearing lower clamping means, upper clamping means slidably mounted with respect to said members, a backing bar and supporting members reciprocable between said members, said backing bar arranged to be raised between said clamping devices to permit the alignment of sheet edges against the sides of said backing bar when said clamp bearing members are rocked away from each other, said clamping bearing members adapted to be rocked upon the lowering of said backing bar to a position to bring said sheet edges in exact abutment, means for raising said backing bar against the actual edges of said abutted sheets, said upper clamping members having projecting lips adapted to approach each other adjacent said abutted sheet edges, means for raising said backing bar under pressure so as to force said sheets against said projecting lips, said backing bar made of relatively flexible construction, said pressure means adapted to flex said bar so as to bring said bar into accurate supporting contact with said abutted sheet edges, and means for heating said backing bar to a temperature approaching that of the weld.

13. In a welding device, a backing bar of metal having substantial depth and having a surface adapted to contact and support the actual edges of abutted sheets, a resistance bar let into said surface, insulating means supporting said resistance bar from said backing bar said bar being rendered more flexible by cuts therein extending toward said supporting surface from an opposed surface.

RALPH E. ASBURY.